Feb. 3, 1970  J. W. CRAIN  3,492,729
MEASURING ROD

Filed Feb. 13, 1967  3 Sheets-Sheet 1

James W. Crain,
Inventor,
Koenig, Senniger, Powers and Leavitt
Attorneys.

Feb. 3, 1970   J. W. CRAIN   3,492,729
MEASURING ROD
Filed Feb. 13, 1967   3 Sheets-Sheet 2

Feb. 3, 1970  J. W. CRAIN  3,492,729
MEASURING ROD

Filed Feb. 13, 1967  3 Sheets-Sheet 3

3,492,729
MEASURING ROD
James W. Crain, 600 Commercial Ave.,
Mound City, Ill. 62963
Filed Feb. 13, 1967, Ser. No. 615,539
Int. Cl. G01c *15/06*
U.S. Cl. 33—74                                      9 Claims

ABSTRACT OF THE DISCLOSURE

A measuring and direct reading leveling rod is described which includes a plurality of concentric coaxial tubes telescopically assembled one within another for extension and retraction relative to each other, each inner tube being lockable in an extended position relative to the next larger outer tube. The tubes each contain numerical indicia designating three separate scales which are continuous from one tube to the next tube. The numerical indicia is arranged so that a minimum number of the tubes need be extended in order to obtain a specific numerical reading on one of the other of the scales. The outermost tube can be clamped in various adjusted positions relative to a transparent base member thereby to fix and hold all of the tubes at a desired elevated position.

BACKGROUND OF THE INVENTION

The invention pertains to rods for measuring heights and elevations, and more particularly to such rods which are direct reading. Self reading leveling rods provided with an extendable foot are known, and measuring rods which have telescoping sections have been used. However, these and other prior art rods are complex in structure, difficult to use and are limited in their utility, i.e., they are normally useable only for surveying, or for height measurements, not both, and do not have a wide range of measurement of heights and elevations. Also, the arrangement of the scale on the prior art rods frequently requires maximum extension of the rods in order to achieve the desired readings. Moreover, because the extensive use of metal in some prior rods, it is dangerous to use them for measuring the height of certain overhead objects, such as electrical current carrying conductors.

SUMMARY OF THE INVENTION

Among the several objects of the invention may be noted the provision of an improved measuring rod suitable for use both as a surveying or leveling rod for determining the elevation of various locations or points and also useable for measuring the distance between two points, such as the ground and an overhead object; the provision of a surveying rod which has scales arranged on it so that the rod need be elevated above the ground a minimum distance; the provision of a measuring rod for measuring the height of overhead objects wherein a direct reading can be obtained at substantially eye level; and the provision of a direct reading measuring rod wherein the maximum number of readings can be made before readjusting the rod. Other objects and features will be in part apparent and in part pointed out hereinafter.

A rod of the invention for measuring heights, elevations or the like comprises a plurality of tubes telescopically assembled for extension and retraction relative to each other. Means are provided for locking each of the inner tubes in an extended position relative to the next larger outer tube. Each tube contains numerical indicia designating at least two separate scales with each of the scales being continuous from one tube to the next tube when the tubes are extended and locked relative to each other. The numerical indicia on each scale is staggered relative to the numerical indicia on the other scales. A transparent tubular base member is provided within which the tubes telescope and which is height adjustable relative to the tubes. The lowermost one of the tubes can be fixed in any desired position relative to the base member when the lowermost tube is in an elevated position above the bottom of the base member.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
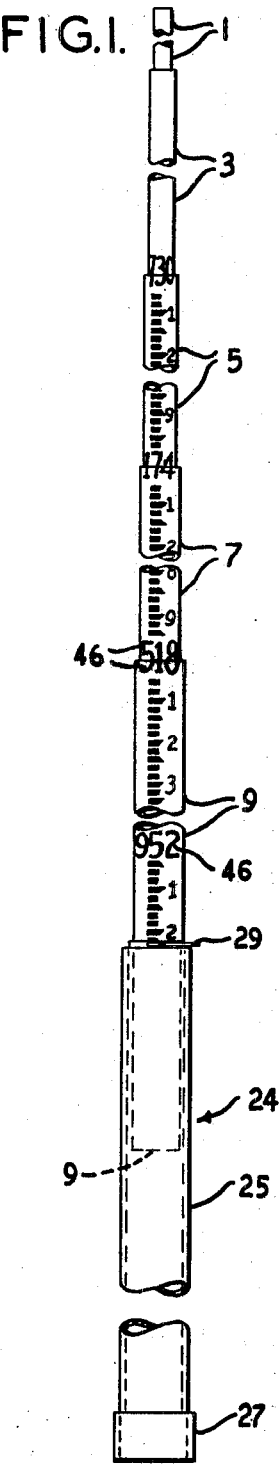
FIG. 1 is an elevation, partially broken away, showing a measuring rod of the invention in the extended position.

Referring to the drawings, a measuring rod of the invention comprises a plurality of tubes of the same length telescopically assembled for extension and retraction relative to each other. By way of example, five tubes 1, 3, 5, 7 and 9 have been shown in the drawings. However, it will be understood that more or fewer tubes can be used as desired.

Figure 3:
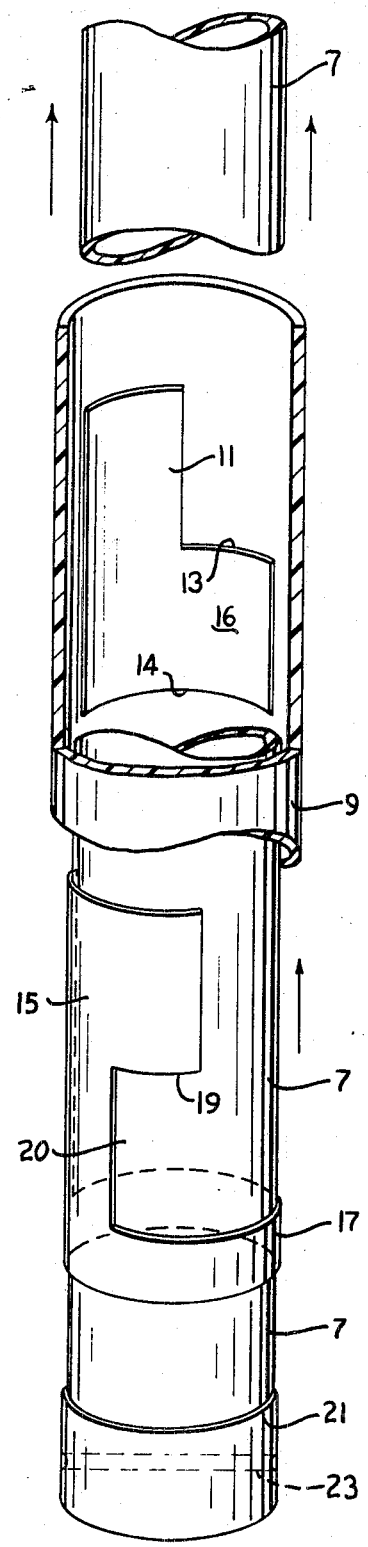
FIG. 3 is a fragmentary view showing how two sections of the tubing are locked when one tube is in the extended position relative to the other tube.

Each of the inner tubes can be locked in an extended position relative to the next larger outer tube by the locking structure illustrated in FIG. 3 of the drawings for the tubes 7 and 9. The locking structure comprises a rigid generally L shaped sheet of material designated 11 which is secured to the inner surface of the outer tube 9 near the top of the tube by a suitable adhesive (not shown). Sheet 11 is cut away at the top and along one side to form a shoulder 13 which extends arcuately a short distance around the inner periphery of the tube. Preferably the total width of sheet 11 is such that it extends less than halfway around the tube. The portion of sheet 11 between shoulder 13 and the lower edge 14 of the sheet is designated 16 and comprises a locking member for holding tube 7 in its extended position as explained later.

Another rigid sheet of material designated 15 is fixed on or bonded to the outer surface of tube 7 near the lower end thereof by an adhesive (not shown). Sheet 15 comprises a lower annular collar portion 17 which forms a stop. Sheets 11 and 15 have substantially the same radius of curvature so that as tube 7 moves axially in tube 9 (as explained later) the lower edge 14 of sheet 11 engages the upper edge of collar 17 to limit upward movement of the tube 7 relative to the tube 9. The main body of sheet 15 projects upwardly from the collar 17 and is partially cut away along one side to form a shoulder 19 facing downwardly toward the collar.

The notch or slot 20 between collar 17 and shoulder 19 forms a locking member and it is wide enough to receive the complementary-shaped locking member 16. Except for the collar 17, the sheet 15 extends less than halfway around the tube 7. While the width of sheets 11 and 15 may be varied, the sum of their widths (excluding collar 17) should not exceed the circumference of a circle having the same radius as the curvature of the sheets. This permits them to move axially past each other as explained later. This relative movement can occur only when the portions of sheet 15 above collar 17 are staggered circumferenetially from the sheet 11 as shown in FIG. 3 of the drawings.

To lock the tubes together, tube 7 is rotated to place sheet 11 out of axial alignment with the upper portion of sheet 15, and then tube 7 is extended as indicated by the arrows in FIG. 3 until the lower edge 14 of sheet 11 engages collar 17. This interengagement prevents complete withdrawal of tube 7. Then the tubes are rotated relative to each other to move locking member 16 into the complementary locking member formed by slot 20. When the parts are in this position the interlocking engagement between the locking members prevents downward movement of tube 7 relative to tube 9. Tube 7 is retracted into tube 9 by first rotating the tube 7 (or tube 9) to disengage locking member 16 from slot 20 and then sliding tube 7 downwardly through tube 9 to its retracted position within tube 9. By way of example, each tube 1-9 can be slightly more than four feet long and the locking members located so that four feet of each inner tube projects from the next larger outer tube when the tubes are locked together.

At the lower end of each tube there is a collar such as shown at 21 (FIG. 3) on tube 7. This collar has substantially the same outside diameter as the inside diameter of the next larger tube and it is spaced from collar 17. The size of and spacing between the collars maintains axial alignment of one tube relative to each other. A pin 23 across the lower end of tube 7 about one half inch from the lower end of the tube is engageable by the lower end of tube 5 when it is retracted into tube 7, thereby limiting retraction of the tube 5. A pin similar to that shown at 23 is provided at the lower end of tubes 3, 5, 7 and 9. Since the tubes are preferably the same length, a small portion (about one half inch) of each tube 1, 3, 5 and 7 projects above the upper end of the next larger tube when the inner tube is fully retracted relative to the other tube. The projecting end can be grasped for extending the inner tube relative to the outer tube.

The measuring rod further comprises a base generally designated 24. The base has a transparent tubular member 25 which is closed at the lower end by a cap or cover 27. At the upper end of the base there is a toggle clamp 29 which is fixed to member 25 by a pair of rivets 31 or other suitable fastening means. Clamp 29 comprises a collar portion 33 which extends substantially entirely around the peripherry of base member 25 and tube 9. The collar is split between rivets 31 as shown at 34. A latch member 35 is pivoted at 36 to one end portion of the collar. A link member 37 has a pin 38 at one end adapted to be received in an open hook-like portion 39 on the other end portion of the collar. The other end of the link is pivoted at 40 to an intermediate part of the latch member so that when the latch member 35 is swung to the position shown in FIG. 2 where it is adjacent or against collar 33 the collar is drawn tightly against the tube 9 to thereby clamp this tube relative to the upper end of the base member 25. By swinging latch member 35 outwardly away from the collar 33, the collar is opened at split 34 and tube 9 can be moved axially relative to the base. Base 24 is preferably five feet long when the tubes 1-9 are each slightly more than four feet long.

Figure 2:
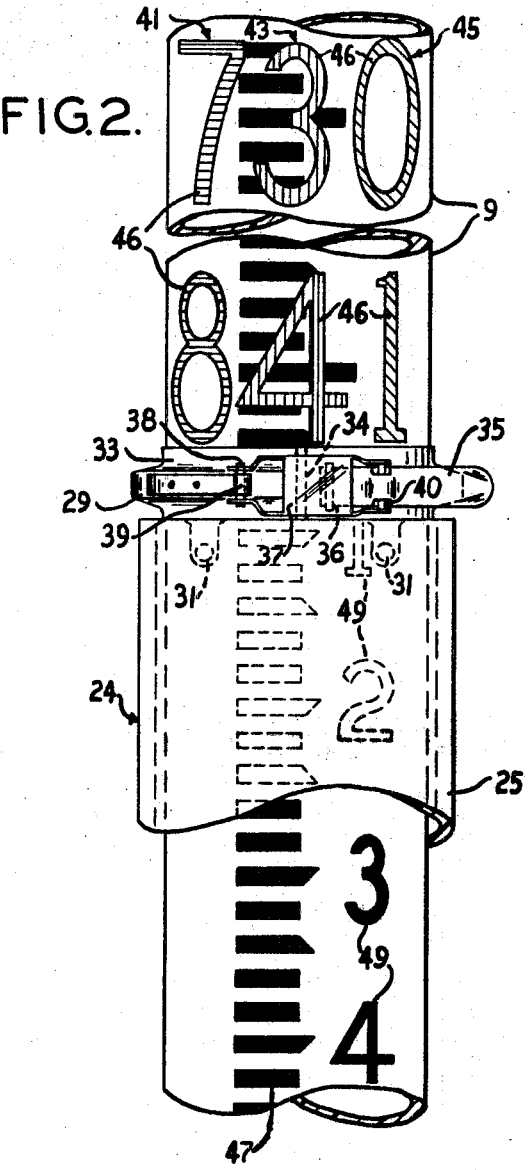
FIG. 2 is an enlarged fragmentary view of the upper portion of the base member and the outermost tube.

Numerical indicia is provided on each of the tubes to form three separate scales designated 41, 43 and 45 (FIG. 2). In order to readily distinguish the scales from each other the numbers 46 on each scale which designate feet are desirably formed with different colored letters. By way of example, the hatching used in the drawings shows scale 41 as blue, scale 43 as red, and scale 45 as green. The scale markings 47 between the foot-markers divide the scales into tenths and hundredths of a foot, the tenths of a foot being marked off by the plain (unhatched) letters designated 49. Each mark 47 represents two-hundredths of a foot in the particular scale shown. However, it will be understood that scale markings may be spaced at other intervals if desired. Marks 47 and numbers 49 are common to each of the three scales 41, 43 and 45.

The numbers 46 adjacent each other on scales 41, 43 and 45 are staggered relative to each other as shown by numbers 8-4-1 and 7-3-0 in FIGURE 2 and this permits the various tubes 1-9 to be extended a minimum distance from base 24 in order to view a particular number on one or the other of the scales.

Each of the scales 41, 43 and 45 is continuous from one tube to the next tube when the tubes are extended and locked in position relative to each other. This is shown in FIG. 1 where the numbers 5, 1 and 8 on scales 41, 43 and 45, respectively, are split with the top half appearing on the bottom of tube 7 and the bottom half appearing on the top of tube 9.

Preferably the numbers on each of the scales 41, 43 and 45 sequentially increase from the top of the innermost tube 1 to the bottom of the outermost tube 9. Also, it is preferred that scale 43 begins at the top of tube 1 with a number which is equal to the total length of the base 24, e.g., five feet. This permits measurement of the height of an overhead object by placing the bottom of the cover 27 on the ground and then extending the tubes one at a time beginning with tube 1 until the upper end of tube 1 engages the overhead object. Assuming the height of the overhead object is between 5 and 10 feet, its exact height is then determined by direct reading of the indicia on scale 43 across the upper edge of clamp 29. If the height is greater than 10 feet and less than 20 feet, the reading on scale 43 across the upper edge of clamp 29 represents the unit, tenths and hundredths of the height and the prefix digit 1 is added in the ten's place. For example, if the overhead object is between 10 and 20 feet and as shown in FIG. 2 the reading on scale 43 is 4.05, the actual height is 14.05 feet. Similarly, if the height of the object is between 20 and 30 feet, the prefix digit of 2 is added in the ten's place, and the reading on FIG. 2 would indicate a height of 24.05 feet.

Measurements can also be taken between points or objects which are located other than in a vertical direction. For example, horizontal distances can also be measured by placing the bottom of cover 27 of the base at one of the points and then extending the tubes in a horizontal direction until the upper end of tube 1 contacts the other point, and then measuring or reading the distance between the points across the upper edge of clamp 29.

Figure 4:
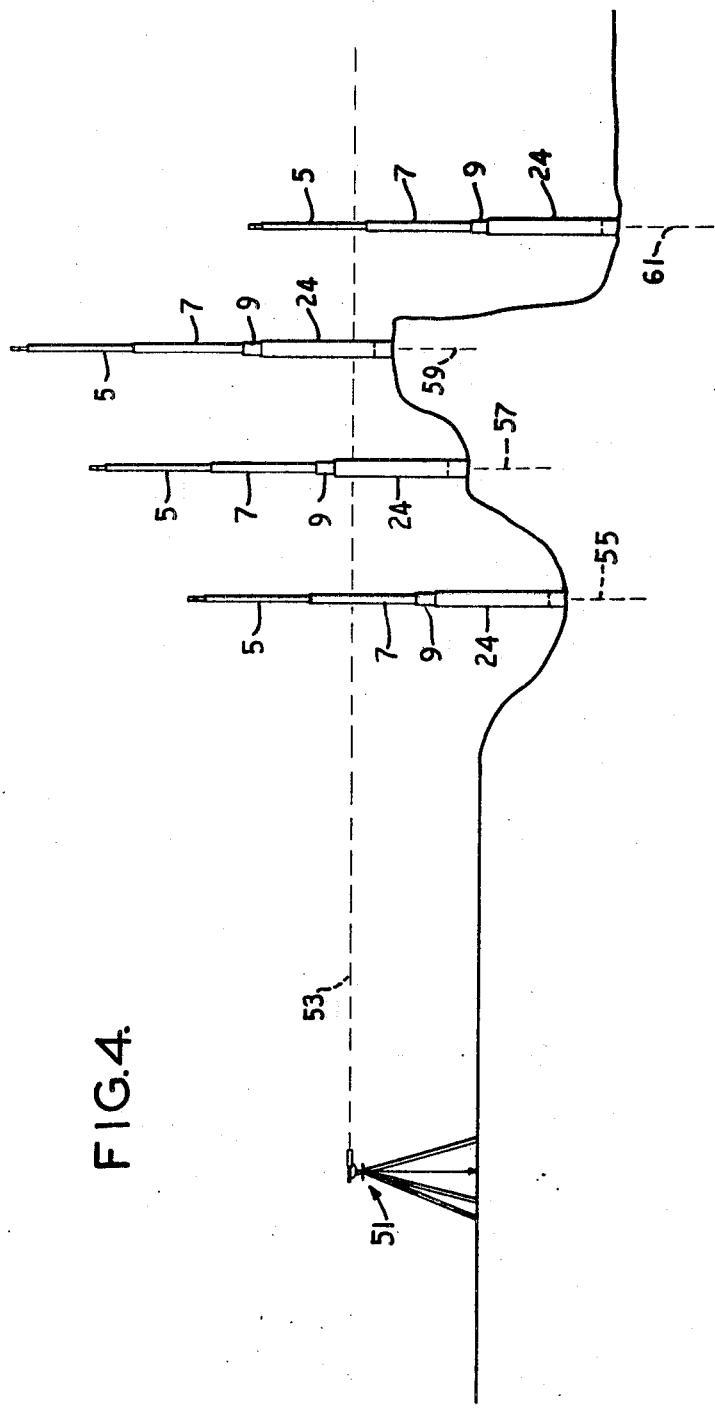
FIG. 4 is a diagrammatic view illustrating use of the rod for surveying and leveling.

FIG. 4 of the drawing illustrates use of the rod for surveying and leveling. A conventional surveyor's leveling instrument designated 51 is set up in the usual manner so that the sight line of the horizontal cross hair of the instrument is represented by line 53. The measuring rod is placed at a point of known elevation, such as at a bench mark or other point of known elevation and one or more of the tubes 1-9 are extended and locked in the extended position. The extended locked-together tubes are then moved upwardly as a unit relative to transparent base 24 until the line of sight 53, or the image of the instrument's horizontal cross hair, is in alignment with the unit, tenths and hundredths of the known elevation on one of the scales 41, 43 or 45, of the leveling rod. Toggle clamp 29 is then operated to lock the base 24 to tube 9 in that position. For example, if the point of known elevation is 746.02, a reading of 6.02 on one of the scales (e.g., the blue scale 41) should be aligned with the instrument's horizontal cross hair image.

The measuring rod is then moved to other points of various elevations along the course to be surveyed, such points or stations being designated 55, 57, 59 and 61 in FIG. 4. With the leveling rod in each of these positions, the blue scale is read through the leveling instrument 51 and the reading visible along line 53 (together with the prefix "74") gives directly the true and exact elevation at the respective stations.

If the course being surveyed is uphill from the surveying instrument, as in the case of stations 55, 57 and 59, then the maximum amount of tube 9 should remain in the transparent tube 25 since the scales can be read directly through the base member (as shown at stations 57 and 59) and this permits elevation readings to be taken at the maximum number of stations prior to readjusting the rod.

Minimum extension of tube 9 is achieved by proper selection of the staggered scales 41, 43 or 45. On the other hand, when the course being surveyed is downhill from surveying instrument 51 (as at station 61) then the tubes are preferably extended a maximum amount at the station of known elevation so that readings can be taken at a maximum number of stations before readjusting the rod. The staggered scales 41, 43 and 45 also permit maximum extension for this purpose. When tube 9 is readjusted in tube 25, then readings may be taken on the same or a different one of the scales 41, 43 or 45. When each tube 1 through 9 contains at least four feet of each scale, then approximately twenty feet is available on each scale and therefore in conjunction with the transparent base member there is much greater flexibility of use, and a much wider range of elevation can be measured before readjustment of the rod than when using prior rods.

The measuring rod of the invention can also be used for locating a series of points or positions having the same elevation, such being desirable when the water level of a proposed pond or lake is to be determined, for example. This is done by sighting through the surveying instrument 51 and reading any scale value on the measuring rod when the rod is at a reference elevation. Then the rod is moved to other points where the same scale marking is visible through the instrument 51 by sighting along line 53. Any point where this particular scale marking is visible through the instrument 51, is at the same elevation as the reference point. In this manner the entire circumference or periphery of the future pond or lake can be determined.

While three specific exemplary applications or uses for the measuring rod of the invention have been described, it will be understood that other uses can also be made without departing from the scope of the invention.

Preferably the tubular base member 25 is made of transparent synthetic clear resin material, such as methyl methacrylate. The tube sections 1–9 may be made of epoxy, phenolic or other preferably thermosetting type synthetic resin impregnated fiberglass sheets. Preferably the parts of the rod are made of dielectric materials such as those mentioned above so that the rod can be used as a direct measuring rod for determining the height of overhead electric current carrying conductors without subjecting the user of the rod to dangerous electric shocks.

In view of the above it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A rod for measuring heights, elevations or the like comprising:
    a plurality of tubes telescopically assembled for extension and retraction relative to each other,
    means for locking each of the inner tubes in an extended position relative to the next larger outer tube.
    each tube containing numerical indicia designating at least two separate scales with each of the scales being continuous from one tube to the next tube when the tubes are extended and locked relative to each other, the numerical indicia on each scale being staggered relative to the indicia on the other scales.
    a transparent tubular base member within which the outermost one of said tubes telescopes and which is height adjustable relative thereto, and
    means operative between said outermost tube and said base member for holding the outermost one of the tubes relative to the base member in any desired adjusted position when the outermost tube is in an elevated position relative to the bottom of the base member.

2. A rod as set forth in claim 1 wherein the numerical indicia on at least one scale increases from the top of the innermost one of the tubes to the bottom of the outermost tube when the tubes are extended and locked, and said numerical indicia on said one scale begins at the top of said innermost tube with a number equal to the length of said base member whereby the distance between two points can be determined by placing the bottom of the base member at one point, extending the tubes relative to the base member until the end of the innermost tube is at the other point, and then reading the scale across the top of said base member, said reading comprising the distance between said points.

3. A rod as set forth in claim 1 wherein three scales are provided on each tube, each of the scales being aligned with the other two scales, one scale being four units larger than a second one of the scales and being seven units larger than the third one of the scales.

4. A rod as set forth in claim 1 wherein the locking means comprises a first member on the outer surface of each of the inner tubes and a second member on the inner surface of each of the outer tubes, said members on the adjacent tubes having complementary formations adapted to be interlocked when the tubes are extended by relative rotation of the tubes to prevent relative axial movement between the tubes, and the formations being adapted to be disengaged by the opposite relative rotation of the tubes, thereby permitting retraction of the inner tube into the outer tube.

5. A rod as set forth in claim 4 further comprising means on the tubes for limiting extension of each inner tube relative to the next larger outer tube.

6. A rod as set forth in claim 1 further comprising means at the lower end portion of each outer tube engageable by the lower end portion of the next smaller inner tube to limit retraction of each of the inner tubes into the outer tubes.

7. A rod as set forth in claim 1 wherein the means for holding the outermost one of the tubes relative to the base member comprises a toggle clamp at the upper end of the base member adapted to grip the outermost tube to fix said tube relative to the base member.

8. A rod as set forth in claim 2 wherein three scales are provided on each tube, each of the scales being aligned with the other two scales, one scale being four units larger than a second one of the scales and being seven units larger than the third one of the scales, the indicia of the respective scales being of different distinctive respective colors.

9. A rod as set forth in claim 8 wherein each of said tubes and the transparent base member are of substantially equal lengths.

References Cited

UNITED STATES PATENTS

| | | | |
|---|---|---|---|
| 1,003,626 | 9/1911 | Malcolm | 33—161 |
| 1,457,964 | 6/1923 | Doty. | |
| 1,629,829 | 5/1927 | Linn | 33—161 |
| 2,556,348 | 6/1951 | Thompson. | |

FOREIGN PATENTS

| | | |
|---|---|---|
| 2,853 | 12/1900 | Germany. |
| 347,362 | 8/1960 | Switzerland. |

HARRY N. HAROIAN, Primary Examiner

U.S. Cl. X.R.

33—161